(12) United States Patent
Tamura et al.

(10) Patent No.: US 12,230,446 B2
(45) Date of Patent: Feb. 18, 2025

(54) DIELECTRIC MATERIAL, MULTILAYER CERAMIC ELECTRONIC DEVICE, AND MANUFACTURING METHOD OF MULTILAYER CERAMIC ELECTRONIC DEVICE

(71) Applicant: TAIYO YUDEN CO., LTD., Tokyo (JP)

(72) Inventors: Kana Tamura, Takasaki (JP); Koichiro Morita, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 118 days.

(21) Appl. No.: 18/162,588

(22) Filed: Jan. 31, 2023

(65) Prior Publication Data

US 2023/0274885 A1 Aug. 31, 2023

(30) Foreign Application Priority Data

Feb. 25, 2022 (JP) .................. 2022-027484

(51) Int. Cl.
| | | |
|---|---|---|
| H01G 4/12 | (2006.01) | |
| C04B 35/468 | (2006.01) | |
| H01G 4/008 | (2006.01) | |
| H01G 4/012 | (2006.01) | |
| H01G 4/30 | (2006.01) | |

(52) U.S. Cl.
CPC ....... *H01G 4/1227* (2013.01); *C04B 35/4682* (2013.01); *H01G 4/008* (2013.01); *H01G 4/012* (2013.01); *H01G 4/30* (2013.01)

(58) Field of Classification Search
CPC .... C04B 35/4682; H04G 4/008; H04G 4/012; H04G 4/1227; H04G 4/30
See application file for complete search history.

(56) References Cited

U.S. PATENT DOCUMENTS

| | | | |
|---|---|---|---|
| 2002/0177519 A1 | 11/2002 | Kawamoto et al. | |
| 2019/0237254 A1 | 8/2019 | Sakurai et al. | |
| 2021/0383973 A1* | 12/2021 | Matsumoto | .......... H01G 4/1227 |
| 2022/0223346 A1* | 7/2022 | Morita | ................ C04B 35/4682 |
| 2022/0415576 A1* | 12/2022 | Tsushima | ................ H01G 4/012 |
| 2023/0207203 A1* | 6/2023 | Lee | ......................... H01G 4/224 |
| | | | 361/301.1 |
| 2024/0249883 A1* | 7/2024 | Tsushima | ................ H01G 4/008 |
| 2024/0266113 A1* | 8/2024 | Sasaki | ....................... H01G 4/30 |

FOREIGN PATENT DOCUMENTS

| | | |
|---|---|---|
| JP | 2002265265 A | 9/2002 |
| JP | 2009035431 A | 2/2009 |
| JP | 2019131438 A | 8/2019 |

* cited by examiner

*Primary Examiner* — Nathan Milakovich
(74) *Attorney, Agent, or Firm* — Law Office of Katsuhiro Arai

(57) ABSTRACT

A dielectric material includes a base material containing barium zirconate titanate as a main component, containing zirconium in an amount of 4 at % or more and 30 at % or less with respect to titanium and zirconium, and having an atomic concentration ratio of barium to titanium and zirconium of 1 or more and 1.1 or less, and a subcomponent containing 2 at % or more and 4 at % or less of europium with respect to titanium of the barium zirconate titanate.

15 Claims, 7 Drawing Sheets

DIELECTRIC MATERIAL, MULTILAYER CERAMIC ELECTRONIC DEVICE, AND MANUFACTURING METHOD OF MULTILAYER CERAMIC ELECTRONIC DEVICE

CROSS-REFERENCE TO RELATED APPLICATION

This application is based upon and claims the benefit of priority of the prior Japanese Patent Application No. 2022-027484, filed on Feb. 25, 2022, the entire contents of which are incorporated herein by reference.

FIELD

A certain aspect of the present disclosure relates to a dielectric material, a multilayer ceramic electronic device, and a manufacturing method of the multilayer ceramic electronic device.

BACKGROUND

Multilayer ceramic capacitors are used to eliminate noise in high-frequency communication systems typified by mobile phones. Multilayer ceramic capacitors are also used in electronic circuits (high-reliability applications) that affect human life, such as in-vehicle electronic control devices. Since multilayer ceramic capacitors are required to have high reliability, techniques for improving the reliability have been disclosed (for example, see Japanese Patent Application Publication No. 2002-265265, Japanese Patent Application Publication No. 2019-131438 and Japanese Patent Application Publication No. 2009-35431).

SUMMARY OF THE INVENTION

According to a first aspect of the embodiments, there is provided a dielectric material a dielectric material including: a base material containing barium zirconate titanate as a main component, containing zirconium in an amount of 4 at % or more and 30 at % or less with respect to titanium and zirconium, and having an atomic concentration ratio of barium to titanium and zirconium of 1 or more and 1.1 or less; and a subcomponent containing 2 at % or more and 4 at % or less of europium with respect to titanium of the barium zirconate titanate.

According to a second aspect of the embodiments, there is provided a multilayer ceramic electronic device including: a plurality of dielectric layers, each of which contains a base material containing barium zirconate titanate as a main component, containing zirconium in an amount of 4 at % or more and 30 at % or less with respect to titanium and zirconium, and having an atomic concentration ratio of barium to titanium and zirconium of 1 or more and 1.1 or less, and a subcomponent which contains 2 at % or more and 4 at % or less of europium with respect to the titanium of the barium zirconate titanate; a plurality of internal electrode layers each of which is sandwiched by each two of the plurality of dielectric layers; and external electrodes that are provided on side faces of the plurality of dielectric layers and the plurality of internal electrode layers, and are electrically connected to the plurality of internal electrode layers.

According to a third aspect of the embodiments, there is provided a manufacturing method of a multilayer ceramic electronic device including: forming a ceramic green sheet by mixing a base material containing barium zirconate titanate as a main component, containing zirconium in an amount of 4 at % or more and 30 at % or less with respect to titanium and zirconium, and having an atomic concentration ratio of barium to titanium and zirconium of 1 or more and 1.1 or less, and a subcomponent which contains 2 at % or more and 4 at % or less of europium with respect to the titanium of the barium zirconate titanate; forming an internal electrode pattern on the ceramic green sheet; forming a stack by stacking a plurality of stack units each of which has a structure in which the internal electrode pattern is formed on the ceramic green sheet; and firing the stack so that a plurality of dielectric layers and a plurality of internal electrodes.

DETAILED DESCRIPTION

It is conceivable to use barium zirconate titanate ($BaTi_{(1-x)}Zr_xO_3$) for the dielectric material of multilayer ceramic capacitors. Barium titanate zirconate is a material obtained by substituting $Zr^{4+}$ for $Ti^{4+}$ in $BaTiO_3$, and has high resistance to reduction, suppresses generation of oxygen vacancies, and suppresses deterioration of insulation resistance. However, barium zirconate titanate has the property of being prone to grain growth. Excessive grain growth deteriorates the capacity-temperature characteristics and the high-temperature load life, making it difficult to use barium zirconate titanate for high-reliability applications.

Hereinafter, an exemplary embodiment will be described with reference to the accompanying drawings.

EXEMPLARY EMBODIMENT

Figure 1:
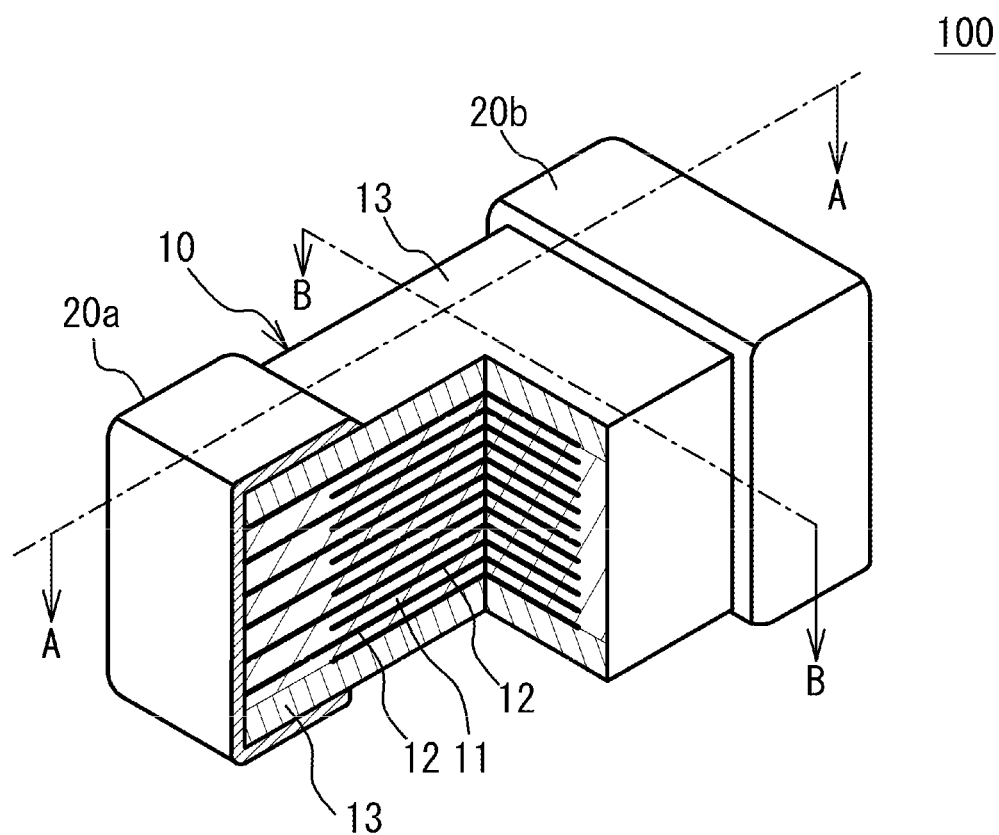
FIG. 1 is a partial cross-sectional perspective view of a multilayer ceramic capacitor.
Figure 2:
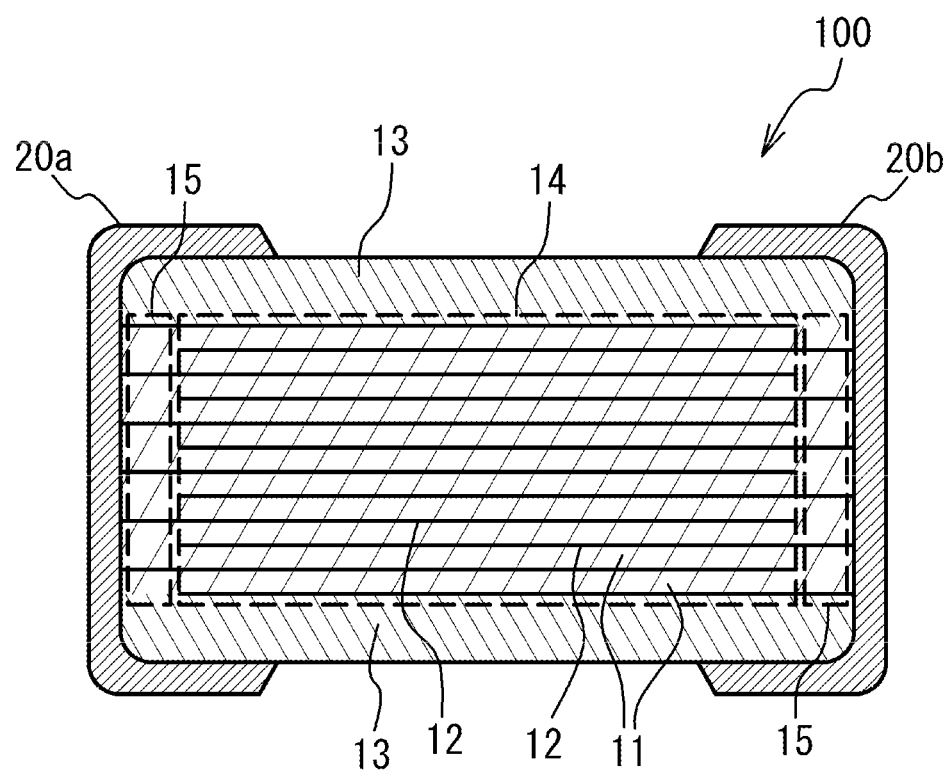
FIG. 2 is a cross-sectional view taken along line A-A in FIG. 1.
Figure 3:
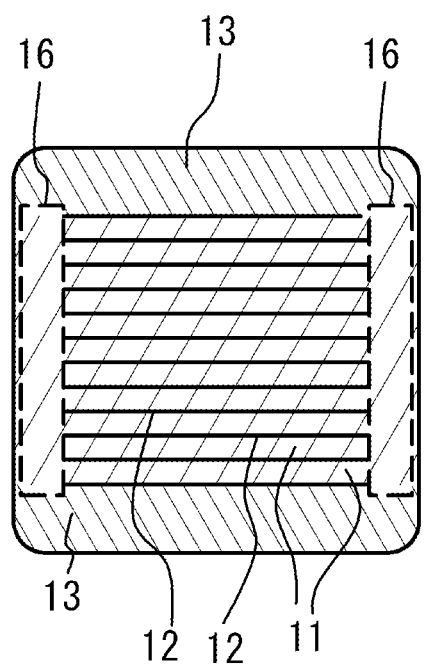
FIG. 3 is a cross-sectional view taken along line B-B in FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two edge faces of the multilayer chip 10 facing each other. Among four faces other than the two edge faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 contains a ceramic material acting as a dielectric material. End edges of the internal electrode layers 12 are alternately exposed to a first edge face of the multilayer chip 10 and a second edge face of the multilayer chip 10 that is different from the first edge face. The external electrode 20a is provided on the first edge face. The external electrode 20b is provided on the second edge face. Thus, the internal electrode layers 12 are alternately electrically connected to the external electrode 20a and the external electrode 20b. Accordingly, the multilayer ceramic capacitor 100 has a structure in which a plurality of the dielectric layers 11 is stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the cover layer 13 may or may not necessarily have the same composition as the dielectric layer 11. It should be noted that the structure is not limited to that illustrated in FIG. 1 to FIG. 3 as long as the internal electrode layers 12 are exposed on two different surfaces and electrically connected to different external electrodes.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them. The thickness of the internal electrode layer 12 is, for example, 0.1 µm or more and 3 µm or less, 0.1 µm or more and 1 µm or less, or 0.1 µm or more and 0.5 µm or less.

The dielectric layer 11 is a dielectric material. The dielectric layer 11 is mainly composed of a ceramic material having a perovskite structure expressed by a general formula $ABO_3$. The perovskite structure includes $ABO_{3-\alpha}$ having an off-stoichiometric composition. In the embodiment $BaTiO_3$ (barium titanate) is used as the ceramic material. For example, in the dielectric layers 11, 90 at % or more of barium titanium zirconate titanate is includes. Moreover, the dielectric layers 11 include a subcomponent including europium. Details of the subcomponent will be described later. The thickness of the dielectric layer 11 is, for example, 0.2 µm or more and 10 µm or less, 0.2 µm or more and 5 µm or less, or 0.2 µm or more and 2 m or less.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin 15. The section where the internal electrode layers 12 connected to the external electrode 20b face each other with no internal electrode layer 12 connected to the external electrode 20a interposed therebetween is also the end margin 15. That is, the end margin 15 is a section where the internal electrode layers 12 connected to one of the external electrodes face each other with no internal electrode layer 12 connected to the other of the external electrodes interposed therebetween. The end margin 15 is a section where no capacity is generated.

As illustrated in FIG. 3, in the multilayer chip 10, the section from each of the two side faces of the multilayer chip 10 to the internal electrode layers 12 is referred to as a side margin 16. That is, the side margin 16 is a section that covers each of the edges, extending toward the respective side faces of the multilayer structure, of the stacked internal electrode layers 12. The side margin 16 is a section where no capacity is generated.

Here, barium zirconate titanate ($BaTi_{(1-x)}Zr_xO_3$) has high reduction resistance, suppresses the generation of oxygen vacancies, and suppresses the deterioration of insulation resistance. However, barium zirconate titanate has the property of being prone to grain growth. Excessive grain growth deteriorates the capacity-temperature characteristics and the high-temperature load life, making it difficult to use barium zirconate titanate for high-reliability applications. Therefore, the multilayer ceramic capacitor 100 according to the present embodiment has a configuration capable of achieving both a long life and excellent capacity-temperature characteristics.

Barium zirconate titanate has a form in which barium titanate is doped with zirconium. The lattice constant of barium titanate crystals having a perovskite structure represented by the general formula $ABO_3$ is expanded. Certain rare earth elements which are the key of lifetime such as holmium (Ho), dysprosium (Dy), and yttrium (Y) dissolve more in the Ti site (B site) than in the Ba site (A site), resulting in an excess of acceptors. Therefore, the improving of the lifetime is limited.

Therefore, the present inventors have investigated rare earth elements with a large ionic radius that are easily substituted and solid-solved in the Ba site of barium titanate. As a result, the present inventors have found that the life is improved by about one order of magnitude compared to the rare earth element such as holmium, dysprosium, and yttrium. The reason why the addition of europium improves the lifetime is not completely clear. Europium is stable at 2 and 3 valences. The valence of europium fluctuates between 2 and 3. Europium has the largest ionic radius in the rare earth elements which are stable under divalence condition. Therefore, europium is selectively substituted and solid-solved at the Ba site due to the ionic radius. Rare earth elements other than europium are stable at trivalence and unstable at divalence.

Table 1 shows the ionic radii of the six coordination of each rare earth element. The source of Table 1 is "RD Shannon, Acta Crystallogr., A32, 751 (1976)".

TABLE 1

| | VALENCE | IONIC RADIUS(Å) | |
| --- | --- | --- | --- |
| | | COORDINATION NUMBER IS 6 | COORDINATION NUMBER IS 12 |
| Ba | +2 | | 1.610 |
| Ti | +4 | 0.605 | |
| Eu | +2 | 1.170 | |
| Dy | +2 | 1.070 | |
| La | +3 | 1.032 | |
| Tm | +2 | 1.030 | |
| Yb | +2 | 1.020 | |
| Ce | +3 | 1.010 | |
| Pr | +3 | 0.990 | |
| Nd | +3 | 0.983 | |
| Pm | +3 | 0.970 | |
| Sm | +3 | 0.958 | |
| Eu | +3 | 0.947 | |
| Gd | +3 | 0.938 | |
| Tb | +3 | 0.923 | |
| Dy | +3 | 0.912 | |
| Ho | +3 | 0.901 | |
| Y | +3 | 0.900 | |
| Er | +3 | 0.890 | |
| Tm | +3 | 0.880 | |
| Yb | +3 | 0.868 | |
| Lu | +3 | 0.861 | |
| Sc | +3 | 0.745 | |

In the dielectric layer 11 of the capacity section 14, when the amount of europium in barium zirconate titanate, which is the main component of the dielectric layer 11, with respect to titanium (the amount of europium (at %) when titanium is 100 at %) is small, a sufficient long lifetime may not be necessarily achieved. Therefore, in the present embodiment, a lower limit is set for the amount of europium with respect to titanium. Specifically, in the dielectric layer 11 of the capacity section 14, the amount of europium with respect to titanium is set to 2 at % or more. The amount of europium with respect to titanium is preferably 2 at % or more, more preferably 3 at % or more.

On the other hand, in the dielectric layer 11 of the capacity section 14, when the amount of europium in barium zirconate titanate, which is the main component of the dielectric layer 11, is large with respect to titanium, the dielectric layer 11 may become a semiconductor and a long life may not be necessarily obtained. Therefore, in the present embodiment, an upper limit is set for the amount of europium with respect to titanium. Specifically, in the dielectric layer 11 of the capacity section 14, the amount of europium with respect to titanium is set to 4 at % or less. The amount of europium with respect to titanium is preferably 4 at % or less, more preferably 3 at % or less.

Next, when "x" in $(BaTi_{(1-x)}Zr_xO_3)$ is small, sufficient reduction resistance may not be necessarily obtained and many oxygen vacancies may be generated. Therefore, in the present embodiment, a lower limit is set for "x". Specifically, "x" is set to 0.04 or more. In other words, in the barium zirconate titanate, zirconium should be 4 at % or more with respect to titanium and zirconium. In barium titanate zirconate, zirconium is preferably 9 at % or more, more preferably 14 at % or more, with respect to titanium and zirconium.

On the other hand, when "x" is large, the diffusion of barium zirconate titanate proceeds and grain growth control may become difficult. Therefore, in the present embodiment, an upper limit is set for "x". Specifically, "x" is set to 0.30 or less. In other words, in barium zirconate titanate, zirconium should be 30 at % or less with respect to titanium and zirconium. In barium titanate zirconate, zirconium is preferably 30 at % or less, more preferably 20 at % or less, with respect to titanium and zirconium.

Next, in barium titanate zirconate, when Ba/(Ti+Zr) (atomic concentration ratio of barium with respect to titanium and zirconium) is large, diffusion of barium zirconate titanate may be suppressed, making sintering difficult. Therefore, in the present embodiment, an upper limit is set for the atomic concentration ratio of barium with respect to titanium and zirconium. Specifically, the atomic concentration ratio of barium with respect to titanium and zirconium is set to 1.1 or less. The atomic concentration ratio of barium to titanium and zirconium is preferably 1.1 or less, more preferably 1.08 or less.

On the other hand, in barium titanate zirconate, when the atomic concentration ratio of barium with respect to titanium and zirconium is small, the diffusion of barium zirconate titanate may proceed, making it difficult to control grain growth. Therefore, in the present embodiment, a lower limit is set for the atomic concentration ratio of barium with respect to titanium and zirconium. Specifically, the atomic concentration ratio of barium with respect to titanium and zirconium is set to 1.0 or more. The atomic concentration ratio of barium with respect to titanium and zirconium is preferably 1.0 or more, more preferably 1.03 or more.

In the dielectric layer 11 in the capacity section 14 of the multilayer ceramic capacitor 100, when at least a part of dielectric crystals containing the base material and subcomponents has a core-shell structure, the dielectric layer 11 in the capacity section 14 has a high dielectric constant, excellent temperature characteristics, and a stable microstructure.

Magnesium is a typical additive that makes up the shell. However, magnesium is a simple acceptor whose valence does not fluctuate, and dissolves in barium zirconate titanate of the dielectric layer 11 to form oxygen vacancies, which limits the reliability.

Therefore, in the present embodiment, in the dielectric layer 11 of the capacity section 14, at least a part of the dielectric crystals containing the base material and the subcomponents has a core-shell structure having a core portion containing barium zirconate titanate as a main component, and a shell portion to which zirconium diffuses. The main component of the shell portion is barium zirconate titanate.

Figure 4A:
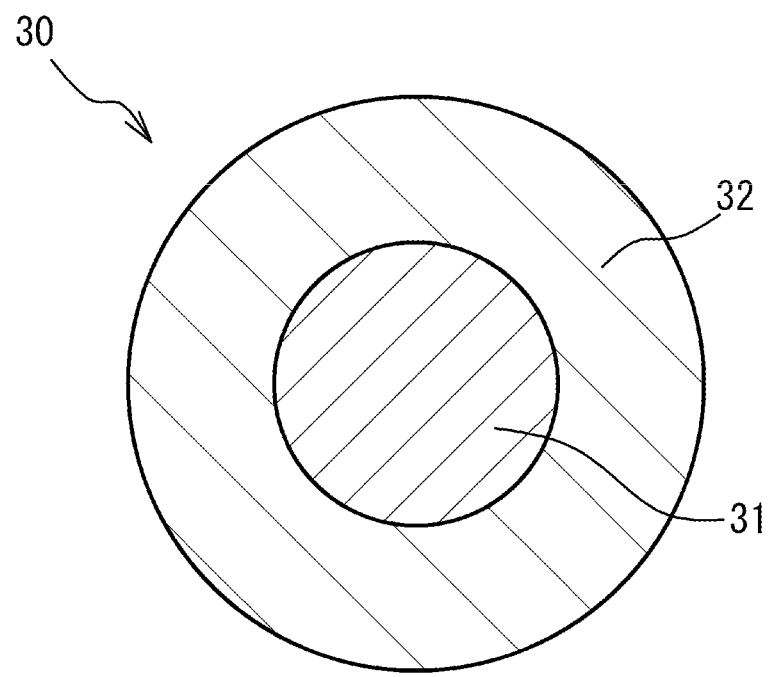
FIG. 4A schematically illustrates a core-shell grain.

As illustrated in FIG. 4A, a core-shell grain 30 includes a substantially spherical core portion 31 and a shell portion 32 that surrounds and covers the core portion 31. The core portion 31 is a crystal portion in which the additive compound is not solid-dissolved or the amount of the additive compound in solid-solution is small. The shell portion 32 is a crystal portion in which the additive compound is dissolved and has a concentration of the additive compound higher than that of the core portion 31. In the present embodiment, the zirconium concentration in the shell portion 32 is preferably higher than the zirconium concentration in the core portion 31.

Figure 4B:
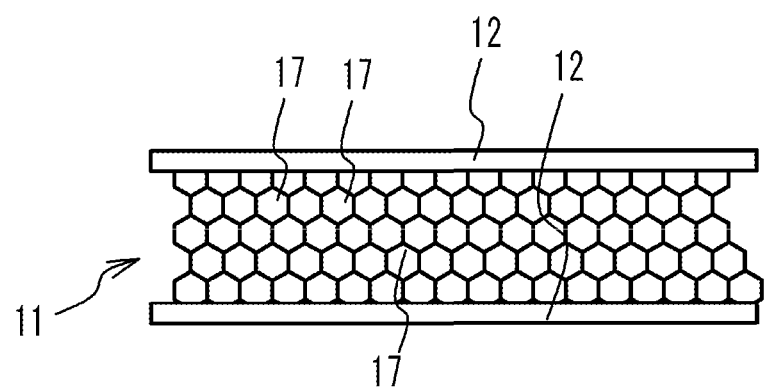
FIG. 4B schematically illustrates a cross section of a dielectric layer.

FIG. 4B is a schematic cross-sectional view of the dielectric layer 11. As illustrated in FIG. 4B, the dielectric layer 11 comprises a plurality of dielectric crystals 17 of the main component ceramic. At least a part of these dielectric crystals 17 are the core-shell grains 30 described in FIG. 4A. By covering the core portion 31 with the shell portion 32 having high zirconium concentration and high reduction resistance, it is possible to obtain a highly reliable material having a stable structure while maintaining a high dielectric constant.

The europium concentration in the shell portion 32 tends to be higher than the europium concentration in the core portion 31.

In the dielectric layer 11, when the average grain size of the dielectric crystals 17 is too small or too large, the rate of change in capacity will increase and X7T characteristics may not be necessarily achieved in the multilayer ceramic capacitor 100. Therefore, in the present embodiment, a lower limit and an upper limit are set for the average grain size of the dielectric crystals 17 in the dielectric layer 11 in the capacity section 14. Specifically, the average grain size of the dielectric crystals 17 in the dielectric layer 11 in the capacity section 14 is preferably 200 nm or more and 400 nm or less. The average grain size of the dielectric crystals 17 in the dielectric layer 11 in the capacity section 14 is preferably 250 nm or more, more preferably 300 nm or more. On the other hand, the average grain size of the dielectric crystals 17 in the dielectric layer 11 of the capacity section 14 is preferably 375 nm or less, more preferably 350 nm or less. The average grain size is obtained by measuring the unidirectional diameters (Feret diameters) of 100 grains constituting the dielectric layer 11 using a 40,000-fold SEM photograph of the dielectric layer 11, and calculating the average value.

When the amount of divalent europium in the europium added to the dielectric layer 11 of the capacity section 14 is small, there is a risk that a sufficiently long life may not be necessarily obtained. Therefore, it is preferable to set a lower limit on the amount of divalent europium in the europium in the dielectric layer 11 of the capacity section 14. For example, in the dielectric layer 11 of the capacity section 14, the ratio of divalent europium is preferably 21% or more, preferably 26% or more, with respect to the total europium (total of divalent europium and trivalent europium).

In order to increase the ratio of divalent europium, it is required to reduce a large amount of trivalent europium. However, grain growth may occur in the dielectric layer 11 during the reduction of much trivalent europium in the annealing step for reduction to divalent europium. Grain growth may shorten the life of the dielectric layer 11. Therefore, when grain growth occurs in the dielectric layer 11, the life-reducing effect due to the grain growth may cancel out the life-improving effect of the valence of europium. In this case, due to the grain growth, the internal electrode layer 12 may not necessarily maintain the structure thereof, and short may occur. Therefore, it is preferable to set an upper limit on the amount of divalent europium in the europium in the dielectric layer 11 of the capacity section 14. For example, in the dielectric layer 11 of the capacity section 14, it is preferable that the amount of divalent europium with respect to the total of europium is 80% or less. It is more preferable that the amount is 70% or less. It is still more preferable that the amount is 59% or less.

Next, when the amount of the rare earth element other than europium added to the dielectric layer 11 of the capacity section 14 is too large, the life improvement effect of europium may be weakened, and sufficient life may not be necessarily obtained. Therefore, it is preferable to set an upper limit for the amount of rare earth elements other than europium. Specifically, in the dielectric layer 11 of the capacity section 14, the atomic concentration of the rare earth element other than europium is preferably lower than the atomic concentration of europium. When there are multiple types of rare earth elements other than europium, the total atomic concentration of the multiple types of the rare earth elements is preferably lower than the atomic concentration of europium.

Silicon has the function of lowering the sintering temperature of barium zirconate titanate. When the amount of silicon is small, sintering may be suppressed. Therefore, in the barium titanate zirconate, it is preferable that the amount of silicon is 1 at % or more with respect to titanium and zirconium.

When the amount of silicon is large, grain growth of barium zirconate titanate will proceed, and there is a risk that sufficient life may not be necessarily obtained. Therefore, in the barium titanate zirconate, the amount of silicon is preferably 1.5 at % or less with respect to titanium and zirconium.

In addition to acting as an acceptor as described above, magnesium also has the effect of suppressing the grain growth of barium zirconate titanate. Therefore, in the barium titanate zirconate, the amount of magnesium is preferably 0.5 at % or more with respect to titanium and zirconium.

When the amount of magnesium is large, grain growth may proceed and sufficient life may not be necessarily obtained. Therefore, in the barium titanate zirconate, the amount of magnesium is preferably 1.5 at % or less with respect to titanium and zirconium.

As described above, according to the present embodiment, the dielectric layer 11 in the capacity section 14 contains barium zirconate titanate as a main component, contains zirconium in an amount of 4 at % or more and 30 at % or less with respect to titanium and zirconium. Moreover, the dielectric layer 11 in the capacity section 14 contains a base material in which an atomic concentration ratio of barium with respect to the titanium and zirconium is 1 or more and 1.1 or less. Moreover, the dielectric layer 11 in the capacity section 14 contains a subcomponent containing 2 at % or more and 4 at % or less of europium with respect to the titanium of barium zirconate titanate. Therefore, it is possible to achieve both the long life and excellent capacity-temperature characteristics.

Figure 5:
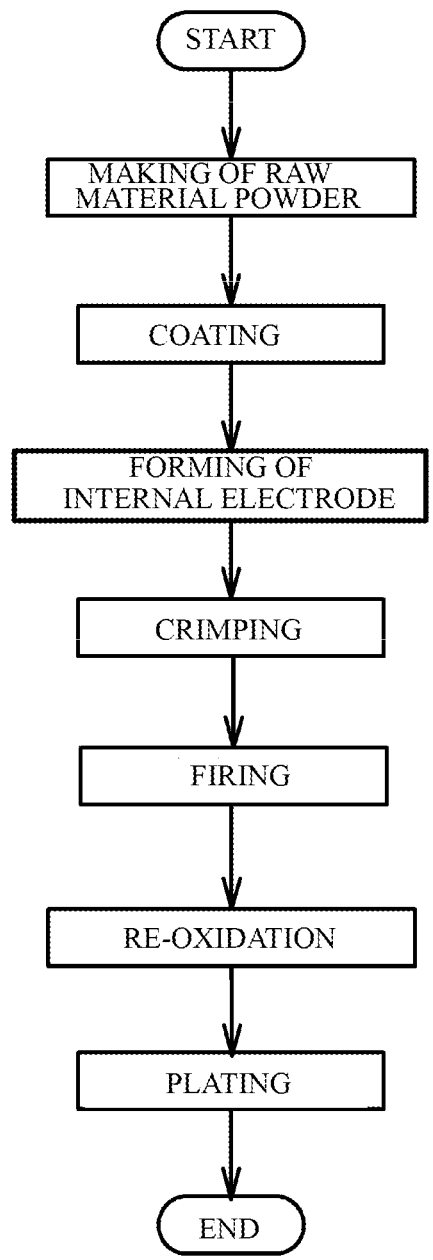
FIG. 5 is a flowchart of a method of manufacturing a multilayer ceramic capacitor.

Next, the manufacturing method of the multilayer ceramic capacitor 100 will be described. FIG. 5 is a flowchart of the manufacturing method of the multilayer ceramic capacitor 100.

[Making of Raw Material Powder]

A dielectric material for forming the dielectric layer 11 is prepared. The A site element and the B site element contained in the dielectric layer 11 are contained in the dielectric layer 11 typically in the form of a sintered compact of $ABO_3$ particles. For example, $BaTiO_3$ is a tetragonal compound having a perovskite structure, and exhibits high dielectric constant. This $BaTiO_3$ can be obtained typically by reacting a titanium raw material such as titanium dioxide with a barium raw material such as barium carbonate to synthesize barium titanate. Various methods have been known as a synthesizing method of ceramic constituting the dielectric layer 11. For example, the solid phase method, the sol-gel method, the hydrothermal method, and the like are known. Any one of the above methods can be employed in the present embodiment.

Additive compound is added to the resulting ceramic powder in accordance with purposes. The additive compound may be an oxide of magnesium, manganese, vanadium (V), chromium (Cr) or europium, or an oxide of cobalt (Co), nickel, lithium (Li), boron (B), sodium (Na), potassium (K) or Si (silicon), or glass. If necessary, an oxide of a rare earth element other than europium may be added. The rare earth element is such as scandium (Sc), yttrium, lanthanum (La), cerium (Ce), praseodymium (Pr), neodymium (Nd), promethium (Pm), samarium (Sm), gadolinium (Gd), terbium (Tb), dysprosium, holmium, erbium (Er), thulium (Tm), ytterbium (Yb), or lutetium (Lu).

For example, a ceramic raw material powder is wet-mixed with a compound containing an additive compound, dried and pulverized to prepare a ceramic material. For example, the ceramic material obtained as described above may be pulverized to adjust the particle size, or combined with a classification process to adjust the particle size. A dielectric material is obtained by the above steps. This dielectric material contains a base material containing barium zirconate titanate as a main component, containing zirconium in an amount of 4 at % or more and 30 at % or less with respect to titanium and zirconium, and having an atomic concentration ratio of barium to titanium and zirconium of 1 or more and 1.1 or less. And, the dielectric material includes a subcomponent containing 2 at % or more and 4 at % or less of europium with respect to titanium of barium zirconate titanate. The based material and the subcomponent are randomly mixed with each other.

[Coating Process]

Next, a binder such as polyvinyl butyral (PVB) resin, an organic solvent such as ethanol or toluene, and a plasticizer are added to the resulting dielectric material and wet-blended. With use of the resulting slurry, a strip-shaped ceramic green sheet with a thickness of, for example, 0.5 μm or more is painted on a base material by, for example, a die coater method or a doctor blade method, and then dried.

[Forming of Internal Electrode]

Next, an internal electrode layer pattern is formed on the surface of the ceramic green sheet by printing a metal conductive paste for forming the internal electrode with use of screen printing or gravure printing. The metal conductive paste for forming the internal electrode contains an organic binder. A plurality of internal electrode layer patterns are alternately exposed to a pair of external electrodes. Ceramic particles are added as a co-material to the metal conductive paste. The main component of the ceramic particles is not particularly limited, but is preferably the same as the main component ceramic of the dielectric layer 11. For example, $BaTiO_3$ of which an average grain size is 50 nm or less may be evenly dispersed.

[Crimping Process]

After that, the ceramic green sheet on which the internal electrode layer pattern is printed is stamped into a predetermined size, and a predetermined number (for example, 100 to 1000) of stamped ceramic green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets to be the cover layers 13 are crimped on the upper face and the lower face of the stacked ceramic green sheets in the stacking direction. And, the resulting multilayer structure is cut into a predetermined chip size (for example, 1.0 mm×0.5 mm).

[Firing Process]

The binder is removed from the resulting ceramic multilayer structure in $N_2$ atmosphere. After that, Ni paste to be the base layer of the external electrodes 20a and 20b is painted by a dipping method. The resulting ceramic multilayer structure is fired in a reducing atmosphere with an oxygen partial pressure of $10^{-12}$ to $10^{-9}$ MPa in a temperature range of 1160° C. to 1280° C. for 5 minutes to 10 hours.

It should be noted that when the rate of temperature rise is set to a slow rate of about 10° C./h, diffusion of the rare earth element and zirconium is promoted in the dielectric material barium titanate, and solid solution grains are formed. In this case, although a long life can be obtained, the dielectric constant tends to be low and the sintering stability and capacity-temperature characteristics tend to be poor. Therefore, in the present embodiment, it is preferable to suppress diffusion of zirconium and form a core-shell structure with a large concentration gradient of zirconium by setting the heating rate to 6000° C./h or more and 10000° C./h or less.

In addition, by adjusting the firing conditions such as the particle size of the barium titanate powder in the dielectric material, the firing temperature, and the firing time, the average grain size of the dielectric crystals 17 in the dielectric layer 11 in the capacity section 14 obtained after firing can be adjusted.

[Re-Oxidation Process]

In order to return oxygen to the barium titanate, which is the partially reduced main phase of the dielectric layer 11 fired in a reducing atmosphere, heat treatment may be performed in a mixed gas of $N_2$ and water vapor at about 1000° C. or in the air at 500° C. to 700° C. to the extent that the internal electrode layers 12 are not oxidized. This step is called a re-oxidation process.

[Plating Process]

After that, metal layers such as Cu, Ni, Sn or the like may be formed on the base layers of the external electrodes 20a and 20b by plating. With the processes, the multilayer ceramic capacitor 100 is fabricated.

According to the manufacturing method according to the present embodiment, barium titanate zirconate is the main component, zirconium is contained in an amount of 4 at % or more and 30 at % or less with respect to titanium and zirconium, and the atomic concentration ratio of barium to titanium and zirconium is 1 or more and 1.1 or less and a subcomponent containing 2 at % or more and 4 at % or less of europium with respect to titanium of barium zirconate titanate are mixed, and the ceramic green sheet is fired to fabricate the multilayer ceramic capacitor 100 achieve a long life and excellent capacity temperature.

In addition, although each of the above-described embodiments describes a multilayer ceramic capacitor as an example of a multilayer ceramic electronic component, it is not limited to this. For example, the configurations of the above embodiments can also be applied to other multilayer ceramic electronic devices such as varistors and thermistors.

Examples

The multilayer ceramic capacitors in accordance with the embodiment were made. And, property of the multilayer ceramic capacitors was measured.

(Example 1) Barium zirconate titanate with a particle size of 200 nm, rare earth oxides, various auxiliary additives, and an organic solvent were weighed so as to have a predetermined ratio, and mixed and pulverized with ϕ1 mm zirconia beads.

"x" of barium zirconate titanate ($BaTi_{(1-x)}Zr_xO_3$) was set to 0.30. An oxide of europium was used as the rare earth oxide, and the amount of europium was set to 3 at % with respect to titanium of barium zirconate titanate. The amount of silicon was set to 1 at % with respect to titanium of barium zirconate titanate. The amount of manganese was set to 0.65 at % with respect to titanium of barium zirconate titanate. The amount of magnesium was set to 1.5 at % with respect to titanium of barium zirconate titanate. The atomic concentration ratio (A/B ratio) of barium to titanium and zirconium was set to 1.100.

(Example 2) In Example 2, "x" of barium zirconate titanate ($BaTi_{(1-x)}Zr_xO_3$) was set to 0.30. An oxide of europium was used as the rare earth oxide, and the amount of europium was set to 2 at % with respect to titanium of barium zirconate titanate. The amount of silicon was set to 1 at % with respect to titanium of barium zirconate titanate. The amount of manganese was set to 0.65 at % with respect to titanium of barium zirconate titanate. The amount of magnesium was set to 1.5 at % with respect to titanium of barium zirconate titanate. The atomic concentration ratio (A/B ratio) of barium to titanium and zirconium was set to 1.090.

(Example 3) In Example 3, "x" of barium zirconate titanate ($BaTi_{(1-x)}Zr_xO_3$) was set to 0.20. An oxide of europium was used as the rare earth oxide, and the amount of europium was set to 3 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.080.

(Example 4) In Example 4, "x" of barium zirconate titanate ($BaTi_{(1-x)}Zr_xO_3$) was set to 0.20. An oxide of europium was used as the rare earth oxide, and the amount of europium was set to 3 at % with respect to titanium of barium zirconate titanate. The amount of silicon was set to 1 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.060.

(Example 5) In Example 5, "x" of barium zirconate titanate ($BaTi_{(1-x)}Zr_xO_3$) was set to 0.20. An oxide of europium was used as the rare earth oxide, and the amount of europium was set to 2 at % with respect to titanium of barium zirconate titanate. The amount of silicon was set to 1 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.060.

(Example 6) In Example 6, "x" of barium zirconate titanate ($BaTi_{(1-x)}Zr_xO_3$) was set to 0.14. An oxide of europium was used as the rare earth oxide, and the amount of europium was set to 3 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.006.

(Example 7) In Example 7, "x" of barium zirconate titanate ($BaTi_{(1-x)}Zr_xO_3$) was set to 0.10. An oxide of europium was used as the rare earth oxide, and the amount of europium was set to 3 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.003.

(Example 8) In Example 8, "x" of barium zirconate titanate ($BaTi_{(1-x)}Zr_xO_3$) was set to 0.10. An oxide of europium was used as the rare earth oxide, and the amount of europium was set to 2 at % with respect to titanium of barium zirconate titanate. The amount of silicon was set to 1 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.003.

(Example 9) In Example 9, "x" of barium zirconate titanate ($BaTi_{(1-x)}Zr_xO_3$) was set to 0.09. An oxide of europium was used as the rare earth oxide, and the amount of europium was set to 3 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.004.

(Example 10) In Example 10, "x" of barium zirconate titanate ($BaTi_{(1-x)}Zr_xO_3$) was set to 0.09. An oxide of europium was used as the rare earth oxide, and the amount of europium was set to 2.5 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.005.

(Example 11) In Example 11, "x" of barium zirconate titanate ($BaTi_{(1-x)}Zr_xO_3$) was set to 0.09. An oxide of europium was used as the rare earth oxide, and the amount of europium was set to 2 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.006.

(Example 12) In Example 12, "x" of barium zirconate titanate ($BaTi_{(1-x)}Zr_xO_3$) was set to 0.04. An oxide of europium was used as the rare earth oxide, and the amount of europium was set to 3 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.004.

(Example 13) In Example 13, "x" of barium zirconate titanate (BaTi$_{(1-x)}$Zr$_x$O$_3$) was set to 0.04. An oxide of europium was used as the rare earth oxide, and the amount of europium was set to 2.5 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.002.

(Example 14) In Example 14, "x" of barium zirconate titanate (BaTi$_{(1-x)}$Zr$_x$O$_3$) was set to 0.04. An oxide of europium was used as the rare earth oxide, and the amount of europium was set to 2.5 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.005.

(Example 15) In Example 15, "x" of barium zirconate titanate (BaTi$_{(1-x)}$Zr$_x$O$_3$) was set to 0.04. An oxide of europium was used as the rare earth oxide, and the amount of europium was set to 2 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 0.75 at % with respect to titanium of barium zirconate titanate. The atomic concentration ratio (A/B ratio) of barium to titanium and zirconium was set to 1.006.

(Example 16) In Example 16, "x" of barium zirconate titanate (BaTi$_{(1-x)}$Zr$_x$O$_3$) was set to 0.14. An oxide of europium was used as the rare earth oxide, and the amount of europium was set to 4 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.003.

(Example 17) In Example 17, "x" of barium zirconate titanate (BaTi$_{(1-x)}$Zr$_x$O$_3$) was set to 0.14. An oxide of europium was used as the rare earth oxide, and the amount of europium was set to 3 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 10.75 at % with respect to titanium of barium zirconate titanate. The atomic concentration ratio (A/B ratio) of barium to titanium and zirconium was set to 1.004.

(Example 18) In Example 18, "x" of barium zirconate titanate (BaTi$_{(1-x)}$Zr$_x$O$_3$) was set to 0.14. An oxide of europium was used as the rare earth oxide, and the amount of europium was set to 3 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.003.

(Example 19) In Example 19, "x" of barium zirconate titanate (BaTi$_{(1-x)}$Zr$_x$O$_3$) was set to 0.14. An oxide of europium was used as the rare earth oxide, and the amount of europium was set to 2.5 at % with respect to titanium of barium zirconate titanate. The amount of silicon was set to 1.25 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.003.

(Example 20) In Example 20, "x" of barium zirconate titanate (BaTi$_{(1-x)}$Zr$_x$O$_3$) was set to 0.14. An oxide of europium was used as the rare earth oxide, and the amount of europium was set to 2.5 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.005.

(Example 21) In Example 21, "x" of barium zirconate titanate (BaTi$_{(1-x)}$Zr$_x$O$_3$) was set to 0.14. An oxide of europium was used as the rare earth oxide, and the amount of europium was set to 2 at % with respect to titanium of barium zirconate titanate. The amount of silicon was set to 1 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.002.

(Example 22) In Example 22, "x" of barium zirconate titanate (BaTi$_{(1-x)}$Zr$_x$O$_3$) was set to 0.14. An oxide of europium was used as the rare earth oxide, and the amount of europium was set to 2 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.006.

(Comparative Example 1) In Comparative Example 1, "x" of barium zirconate titanate (BaTi$_{(1-x)}$Zr$_x$O$_3$) was set to 0.35. An oxide of europium was used as the rare earth oxide, and the amount of europium was set to 3 at % with respect to titanium of barium zirconate titanate. The amount of silicon was set to 1 at % with respect to titanium of barium zirconate titanate. The amount of manganese was set to 0.65 at % with respect to titanium of barium zirconate titanate. The amount of magnesium was set to 1.5 at % with respect to titanium of barium zirconate titanate. The atomic concentration ratio (A/B ratio) of barium to titanium and zirconium was set to 1.100.

(Comparative Example 2) In Comparative Example 2, "x" of barium zirconate titanate ($BaTi_{(1-x)}Zr_xO_3$) was set to 0.02. An oxide of europium was used as the rare earth oxide, and the amount of europium was set to 2 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.000.

(Comparative Example 3) In Comparative Example 3, "x" of barium zirconate titanate ($BaTi_{(1-x)}Zr_xO_3$) was set to 0.14. An oxide of dysprosium (Dy) was used as the rare earth oxide, and the amount of dysprosium was set to 2 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 0.999.

(Comparative Example 4) In Comparative Example 4, "x" of barium zirconate titanate ($BaTi_{(1-x)}Zr_xO_3$) was set to 0.14. An oxide of dysprosium was used as the rare earth oxide, and the amount of dysprosium was set to 2 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 0 at % with respect to titanium of barium zirconate titanate. The atomic concentration ratio (A/B ratio) of barium to titanium and zirconium was set to 1.000.

(Comparative Example 5) In Comparative Example 5, "x" of barium zirconate titanate ($BaTi_{(1-x)}Zr_xO_3$) was set to 0.14. An oxide of gadolinium (Gd) was used as the rare earth oxide, and the amount of gadolinium was set to 2 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.001.

(Comparative Example 6) In Comparative Example 6, "x" of barium zirconate titanate ($BaTi_{(1-x)}Zr_xO_3$) was set to 0.14. An oxide of gadolinium was used as the rare earth oxide, and the amount of gadolinium was set to 2 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 0 at % with respect to titanium of barium zirconate titanate. The atomic concentration ratio (A/B ratio) of barium to titanium and zirconium was set to 1.001.

(Comparative Example 7) In Comparative Example 7, "x" of barium zirconate titanate ($BaTi_{(1-x)}Zr_xO_3$) was set to 0.14. An oxide of lanthanum (La) was used as the rare earth oxide, and the amount of lanthanum was set to 2 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 0.993.

(Comparative Example 8) In Comparative Example 8, "x" of barium zirconate titanate ($BaTi_{(1-x)}Zr_xO_3$) was set to 0.14. An oxide of lanthanum was used as the rare earth oxide, and the amount of lanthanum was set to 2 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 0 at % with respect to titanium of barium zirconate titanate. The atomic concentration ratio (A/B ratio) of barium to titanium and zirconium was set to 0.993.

(Comparative Example 9) In Comparative Example 9, "x" of barium zirconate titanate ($BaTi_{(1-x)}Zr_xO_3$) was set to 0.14. An oxide of holmium (Ho) was used as the rare earth oxide, and the amount of holmium was set to 2 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.000.

(Comparative Example 10) In Comparative Example 10, "x" of barium zirconate titanate ($BaTi_{(1-x)}Zr_xO_3$) was set to 0.14. An oxide of holmium was used as the rare earth oxide, and the amount of holmium was set to 2 at % with respect to titanium of barium zirconate titanate. The amount of silicon was set to 1.5 at % with respect to titanium of barium zirconate titanate. The amount of manganese was set to 0.65 at % with respect to titanium of barium zirconate titanate. The amount of magnesium was set to 0 at % with respect to titanium of barium zirconate titanate. The atomic concentration ratio (A/B ratio) of barium to titanium and zirconium was set to 1.000.

(Comparative Example 11) In Comparative Example 11, "x" of barium zirconate titanate ($BaTi_{(1-x)}Zr_xO_3$) was set to 0.14. An oxide of europium was used as the rare earth oxide, and the amount of europium was set to 1 at % with respect to titanium of barium zirconate titanate. The amount of silicon was set to 1 at % with respect to titanium of barium zirconate titanate. The amount of manganese was set to 0.65 at % with respect to titanium of barium zirconate titanate. The amount of magnesium was set to 1 at % with respect to titanium of barium zirconate titanate. The atomic concentration ratio (A/B ratio) of barium to titanium and zirconium was set to 1.000.

For each of Examples 1 to 22 and Comparative Examples 1 to 11, a ceramic green sheet was coated with a slurry obtained by adding a binder, an internal electrode pattern was printed with nickel paste, stacked, and cut into a 1005 shape. Thus, a 1005-shaped ceramic stack was produced. The ceramic stack was heated to 1230° C. at a temperature elevation rate of 6000° C./h, and high-speed firing was performed. The thickness of the dielectric layer after firing was 2.0 m. The average grain size was adjusted by the amount of titanium (x), the amount of silicon, the amount of magnesium, and the A/B ratio contained in each example and comparative example. When the amount of titanium and the amount of silicon are large, the average grain size tends to be large, and when the amount of magnesium and the A/B ratio are large, the average grain size tends to be small.

(Average grain size) For each of Examples 1 to 22 and Comparative Examples 1 to 11, the average grain size of dielectric crystals in the dielectric layer of the capacity section was measured. The average grain size of the dielectric crystal was measured from the SEM image of the cross section along the stacking direction. The average particle size of Example 1 was 390 nm. The average grain size of Example 2 was 400 nm. The average grain size of Example 3 was 360 nm. The average grain size of Example 4 was 340 nm. The average grain size of Example 5 was 350 nm. The average grain size of Example 6 was 290 nm. The average grain size of Example 7 was 330 nm. The average grain size of Example 8 was 320 nm. The average grain size of Example 9 was 320 nm. The average grain size of Example 10 was 340 nm. The average grain size of Example 11 was 350 nm. The average grain size of Example 12 was 240 nm. The average grain size of Example 13 was 280 nm. The average grain size of Example 14 was 260 nm. The average grain size of Example 15 was 260 nm. The average grain size of Example 16 was 280 nm. The average grain size of Example 17 was 350 nm. The average grain size of Example 18 was 320 nm. The average grain size of Example 19 was 320 nm. The average grain size of Example 20 was 340 nm. The average grain size of Example 21 was 330 nm. The average grain size of Example 22 was 380 nm. The average grain size of Comparative Example 1 was 450 nm. The average grain size of Comparative Example 2 was 300 nm. The average grain size of Comparative Example 3 was 270 nm. The average grain size of Comparative Example 4 was 480 nm. The average grain size of Comparative Example 5 was 320 nm. The average grain size of Comparative Example 6 was 500 nm. The average grain size of Comparative Example 7 was 320 nm. The average grain size of Comparative Example 8 was 450 nm. The average grain size of Comparative Example 9 was 320 nm. The average grain size of Comparative Example 10 was 460 nm. The average grain size of Comparative Example 11 was 350 nm.

(characteristic test) The dielectric constant was measured under the conditions of 1 Vrms and 1 kHz. The temperature characteristic of dielectric constant (TCC) was measured in the range from −55° C. to 125° C. under conditions of 0.2 Vrms and 1 kHz. For the accelerated life, tests were performed at 140° C. and a high temperature and high electric field of 50 V/μm until all 10 samples failed, and the average time was taken as the life value.

When the X7T characteristics (capacity change rate based on 25° C. from −55° C. to 125° C. is +22% to −33%) were satisfied, the X7T characteristics were judged to be good "o". When the X7T characteristics were not satisfied, the X7T characteristics were judged to be bad "x". When a life value was 4000 minutes or more, it was judged that a sufficiently long life was achieved. When the life value was 10000 minutes or more, it was judged that a particularly long life was achieved. When the X7T characteristic was judged as good and the life value was 4000 min or more, the overall judgment was given as "good". When the X7T characteristic was judged as bad or the life value was less than 4000 min, the overall judgment was given as bad "x". When the X7T characteristics was judged as good and the life value was 10000 min or more, the overall judgement was given as very good "double circle". Table 2 to Table 5 show the results.

For Examples 1 to 15, the overall judgment was good "o" or very good "double circle". It is thought that this was because the dielectric layers of the capacity section includes a base material containing barium zirconate titanate as a main component, containing zirconium in an amount of 4 at % or more and 30 at % or less with respect to titanium and zirconium, and having an atomic concentration ratio of barium to titanium and zirconium of 1 or more and 1.1 or less, and a subcomponent containing 2 at % or more and 4 at % or less of europium with respect to titanium of the barium zirconate titanate.

On the other hand, Comparative Example 1 did not satisfy the X7T characteristics. It is thought that this was because the amount of zirconium was large and the diffusion of barium zirconate titanate progressed, making it difficult to control grain growth. Comparative Example 2 satisfied the X7T characteristics, but had a short life value. It is thought that this was because the amount of zirconium was small and many oxygen defects were generated.

Note that when "x" was 0.14 or more, the life value was 10000 min or more. Therefore, it can be seen that "x" is preferably 0.14 or more. From the dielectric constant results of Examples 3 to 15 and Comparative Example 1, it can be seen that "x" is preferably 0.20 or less in order to maintain a high dielectric constant.

From the results of Examples 16 to 22, it can be seen that when the average grain size of the dielectric crystals is in the range of 200 nm or more and 400 nm or less, the X7T characteristics are satisfied and a life value of 10000 min or more is obtained.

From the results of Comparative Examples 3 to 10, sufficient life values could not be obtained under conditions where other rare earth elements were added instead of europium. On the other hand, from the results of Examples 21 and 22, it can be seen that sufficient life values can be obtained if the same amount of europium is used.

In Comparative Example 11, a sufficient life value was not obtained. It is thought that this was because the amount of europium with respect to titanium was small.

Figure 6:
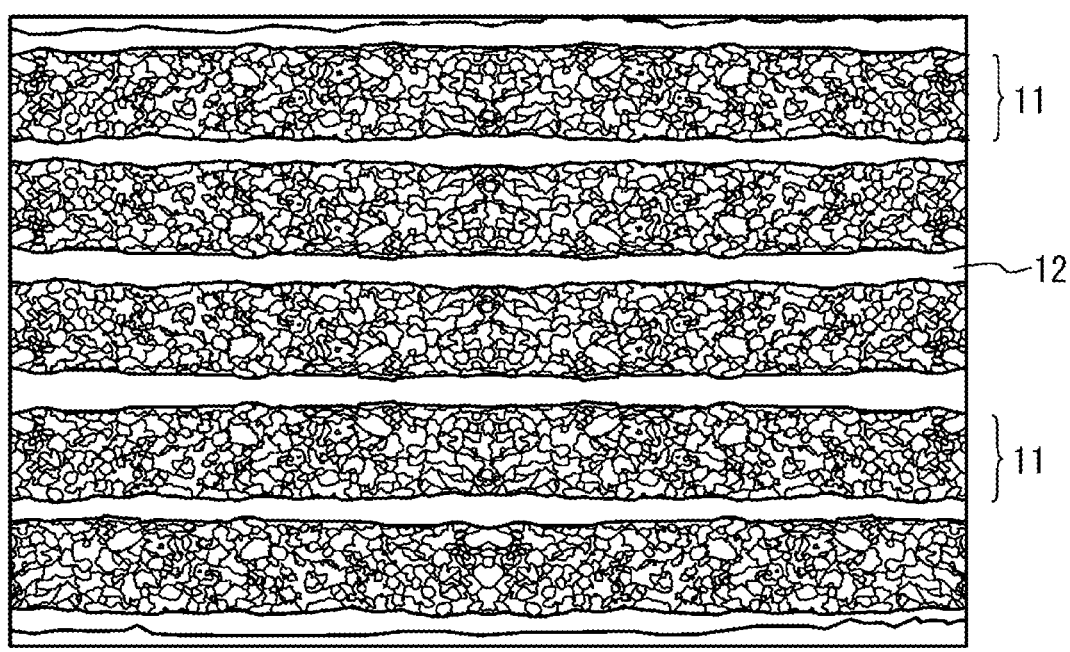
FIG. 6 schematically illustrates a SEM image of cross section of dielectric layers and internal electrode layers in a capacity section of Example 1.
Figure 7:
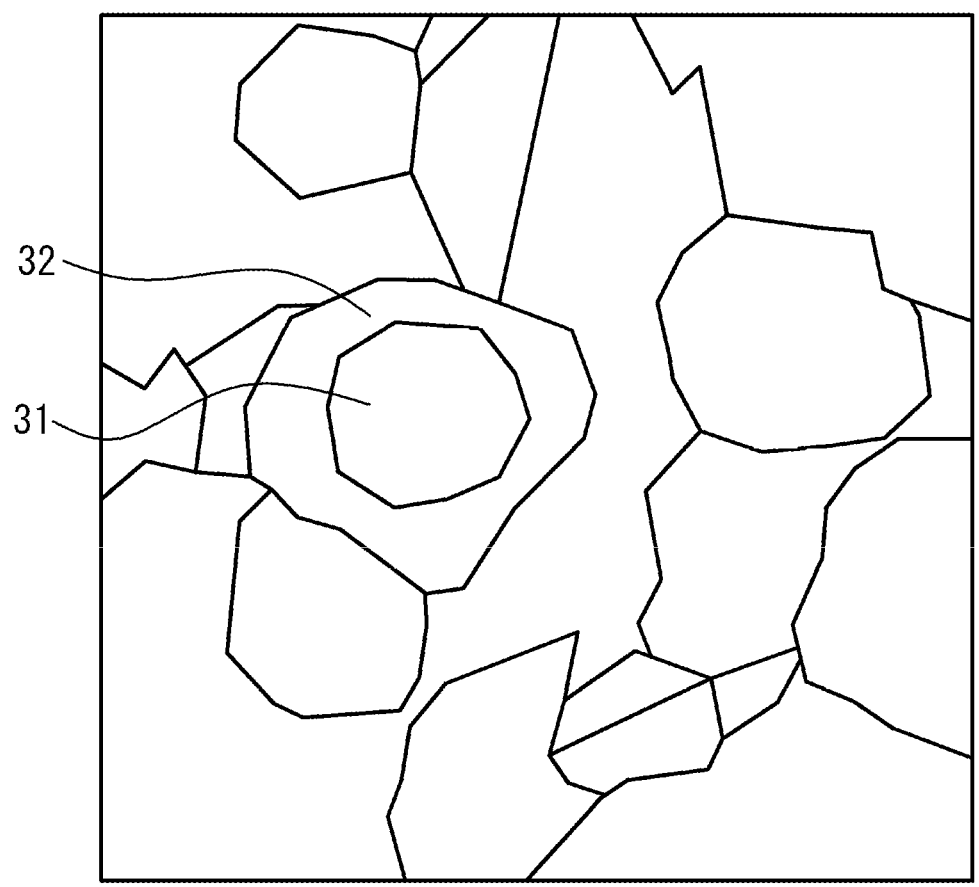
FIG. 7 schematically illustrates a TEM image of a dielectric layer in a capacity section.

Note that FIG. 6 is a schematic diagram of a SEM image of a cross section of the dielectric layer 11 of the capacity section 14 of Example 18. As shown in FIG. 6, the average grain size of the dielectric crystals was 200 nm or more and 400 nm or less, and abnormal grain growth was suppressed. FIG. 7 is a schematic diagram of a TEM (Transmission Electron Microscope) image of the dielectric layer in the capacity section of Example 18. As shown in FIG. 7, the core portion 31 and the shell portion 32 covering the core portion 31 were confirmed in the dielectric layer in the capacity section after firing.

TABLE 2

| | $BaTi_{(1-x)}Zr_xO_3$ x | RARE EARTH TYPE | RARE EARTH AMOUNT (at %) | SUB-COMPONENT Si (at %) | SUB-COMPONENT Mn (at %) | SUB-COMPONENT Mg (at %) | Ba/ (Ti + Zr) |
|---|---|---|---|---|---|---|---|
| COMPARATIVE EXAMPLE 1 | 0.35 | Eu | 3 | 1 | 0.65 | 1.5 | 1.100 |
| EXAMPLE 1 | 0.30 | Eu | 3 | 1 | 0.65 | 1.5 | 1.100 |
| EXAMPLE 2 | 0.30 | Eu | 2 | 1 | 0.65 | 1.5 | 1.090 |

TABLE 2-continued

| | $BaTi_{(1-x)}Zr_xO_3$ x | RARE EARTH TYPE | AMOUNT (at %) | SUB-COMPONENT Si (at %) | Mn (at %) | Mg (at %) | Ba/ (Ti + Zr) |
|---|---|---|---|---|---|---|---|
| EXAMPLE 3 | 0.20 | Eu | 3 | 1.5 | 0.65 | 1 | 1.080 |
| EXAMPLE 4 | 0.20 | Eu | 3 | 1 | 0.65 | 1 | 1.060 |
| EXAMPLE 5 | 0.20 | Eu | 2 | 1 | 0.65 | 1 | 1.060 |
| EXAMPLE 6 | 0.14 | Eu | 3 | 1.5 | 0.65 | 1 | 1.006 |
| EXAMPLE 7 | 0.10 | Eu | 3 | 1.5 | 0.65 | 1 | 1.003 |
| EXAMPLE 8 | 0.10 | Eu | 2 | 1 | 0.65 | 1 | 1.003 |
| EXAMPLE 9 | 0.09 | Eu | 3 | 1.5 | 0.65 | 1 | 1.004 |
| EXAMPLE 10 | 0.09 | Eu | 2.5 | 1.5 | 0.65 | 1 | 1.005 |
| EXAMPLE 11 | 0.09 | Eu | 2 | 1.5 | 0.65 | 1 | 1.006 |
| EXAMPLE 12 | 0.04 | Eu | 3 | 1.5 | 0.65 | 1 | 1.004 |
| EXAMPLE 13 | 0.04 | Eu | 2.5 | 1.5 | 0.65 | 1 | 1.002 |
| EXAMPLE 14 | 0.04 | Eu | 2.5 | 1.5 | 0.65 | 1 | 1.005 |
| EXAMPLE 15 | 0.04 | Eu | 2 | 1.5 | 0.65 | 0.75 | 1.006 |
| COMPARATIVE EXAMPLE 2 | 0.02 | Eu | 2 | 1.5 | 0.65 | 1 | 1.000 |

TABLE 3

| | $BaTi_{(1-x)}Zr_xO_3$ X | RARE EARTH TYPE | AMOUNT (at %) | SUB-COMPONENT Si (at %) | Mn (at %) | Mg (at %) | Ba/ (Ti + Zr) |
|---|---|---|---|---|---|---|---|
| EXAMPLE 16 | 0.14 | Eu | 4 | 1.5 | 0.65 | 1 | 1.003 |
| EXAMPLE 17 | 0.14 | Eu | 3 | 1.5 | 0.65 | 0.75 | 1.004 |
| EXAMPLE 18 | 0.14 | Eu | 3 | 1.5 | 0.65 | 1 | 1.003 |
| EXAMPLE 19 | 0.14 | Eu | 2.5 | 1.25 | 0.65 | 1 | 1.003 |
| EXAMPLE 20 | 0.14 | Eu | 2.5 | 1.5 | 0.65 | 1 | 1.005 |
| EXAMPLE 21 | 0.14 | Eu | 2 | 1 | 0.65 | 1 | 1.002 |
| EXAMPLE 22 | 0.14 | Eu | 2 | 1.5 | 0.65 | 1 | 1.006 |
| COMPARATIVE EXAMPLE 3 | 0.14 | Dy | 2 | 1.5 | 0.65 | 1 | 0.999 |
| COMPARATIVE EXAMPLE 4 | 0.14 | Dy | 2 | 1.5 | 0.65 | 0 | 1.000 |
| COMPARATIVE EXAMPLE 5 | 0.14 | Gd | 2 | 1.5 | 0.65 | 1 | 1.001 |
| COMPARATIVE EXAMPLE 6 | 0.14 | Gd | 2 | 1.5 | 0.65 | 0 | 1.001 |
| COMPARATIVE EXAMPLE 7 | 0.14 | La | 2 | 1.5 | 0.65 | 1 | 0.993 |
| COMPARATIVE EXAMPLE 8 | 0.14 | La | 2 | 1.5 | 0.65 | 0 | 0.993 |
| COMPARATIVE EXAMPLE 9 | 0.14 | Ho | 2 | 1.5 | 0.65 | 1 | 1.000 |
| COMPARATIVE EXAMPLE 10 | 0.14 | Ho | 2 | 1.5 | 0.65 | 0 | 1.000 |
| COMPARATIVE EXAMPLE 11 | 0.14 | Eu | 1 | 1 | 0.65 | 1 | 1.000 |

TABLE 4

| | AVERAGE GRAIN SIZE (nm) | PROPERTY DIELECTRIC CONSTANT | HALT (min) | X7T | OVERALL JUDGE |
|---|---|---|---|---|---|
| COMPARATIVE EXAMPLE 1 | 450 | 900 | 64000 | X | X |
| EXAMPLE 1 | 390 | 850 | 50400 | ○ | ◎ |
| EXAMPLE 2 | 400 | 980 | 44400 | ○ | ◎ |
| EXAMPLE 3 | 360 | 1200 | 29900 | ○ | ◎ |
| EXAMPLE 4 | 340 | 1100 | 31000 | ○ | ◎ |
| EXAMPLE 5 | 350 | 1300 | 26300 | ○ | ◎ |
| EXAMPLE 6 | 290 | 1200 | 19000 | ○ | ◎ |

TABLE 4-continued

|  | AVERAGE GRAIN SIZE (nm) | PROPERTY DIELECTRIC CONSTANT | HALT (min) | X7T | OVERALL JUDGE |
|---|---|---|---|---|---|
| EXAMPLE 7 | 330 | 1400 | 9400 | ○ | ○ |
| EXAMPLE 8 | 320 | 1300 | 8300 | ○ | ○ |
| EXAMPLE 9 | 320 | 1350 | 8700 | ○ | ○ |
| EXAMPLE 10 | 340 | 1460 | 5100 | ○ | ○ |
| EXAMPLE 11 | 350 | 1300 | 4500 | ○ | ○ |
| EXAMPLE 12 | 240 | 1650 | 6500 | ○ | ○ |
| EXAMPLE 13 | 280 | 2440 | 4400 | ○ | ○ |
| EXAMPLE 14 | 260 | 1860 | 4100 | ○ | ○ |
| EXAMPLE 15 | 260 | 1640 | 4000 | ○ | ○ |
| COMPARATIVE EXAMPLE 2 | 300 | 2000 | 2000 | ○ | X |

TABLE 5

|  | AVERAGE GRAIN SIZE (nm) | PROPERTY DIELECTRIC CONSTANT | HALT (min) | X7T | OVERALL JUDGE |
|---|---|---|---|---|---|
| EXAMPLE 16 | 280 | 1100 | 28000 | ○ | ◎ |
| EXAMPLE 17 | 350 | 1320 | 10900 | ○ | ◎ |
| EXAMPLE 18 | 320 | 1330 | 18100 | ○ | ◎ |
| EXAMPLE 19 | 320 | 1340 | 17000 | ○ | ◎ |
| EXAMPLE 20 | 340 | 1400 | 11600 | ○ | ◎ |
| EXAMPLE 21 | 330 | 1360 | 15900 | ○ | ◎ |
| EXAMPLE 22 | 380 | 1520 | 9200 | ○ | ○ |
| COMPARATIVE EXAMPLE 3 | 270 | 1800 | 200 | ○ | X |
| COMPARATIVE EXAMPLE 4 | 480 | 5530 | 20 | X | X |
| COMPARATIVE EXAMPLE 5 | 320 | 2170 | 200 | X | X |
| COMPARATIVE EXAMPLE 6 | 500 | 5440 | 160 | X | X |
| COMPARATIVE EXAMPLE 7 | 320 | 1990 | 0 | X | X |
| COMPARATIVE EXAMPLE 8 | 450 | 5500 | 0 | X | X |
| COMPARATIVE EXAMPLE 9 | 320 | 2000 | 200 | X | X |
| COMPARATIVE EXAMPLE 10 | 460 | 5000 | 20 | X | X |
| COMPARATIVE EXAMPLE 11 | 350 | 2360 | 800 | X | X |

Although the embodiments of the present invention have been described in detail, it is to be understood that the various change, substitutions, and alterations could be made hereto without departing from the spirit and scope of the invention.

What is claimed is:

1. A dielectric material comprising:
   a base material containing barium zirconate titanate as a main component, containing zirconium in an amount of 4 at % or more and 30 at % or less with respect to titanium and zirconium, and having an atomic concentration ratio of barium to titanium and zirconium of 1 or more and 1.1 or less; and
   a subcomponent containing 2 at % or more and 4 at % or less of europium with respect to titanium of the barium zirconate titanate.

2. The dielectric material as claimed in claim 1, wherein the base material contains zirconium in an amount of 14 at % or more with respect to titanium and zirconium in the barium titanate zirconate.

3. The dielectric material as claimed in claim 1, wherein the base material contains 20 at % or less of zirconium with respect to titanium and zirconium in the barium titanate zirconate.

4. The dielectric material claimed in claim 1,
   wherein dielectric crystals each of which contains the base material and the subcomponent, and has a core-shell structure, and
   wherein an average grain size of the dielectric crystals is 200 nm or more and 400 nm or less.

5. The dielectric material claimed in claim 1,
   wherein the subcomponent includes divalent europium and trivalent europium, and
   wherein a ratio of the divalent europium to the total of the divalent europium and the trivalent europium is 21% or more.

6. The dielectric material as claimed in claim 1,
   wherein the subcomponent includes divalent europium and trivalent europium, and wherein a ratio of the divalent europium to the total of the divalent europium and the trivalent europium is 80% or less.

7. A multilayer ceramic electronic device comprising:
a plurality of dielectric layers, each of which contains a base material containing barium zirconate titanate as a main component, containing zirconium in an amount of 4 at % or more and 30 at % or less with respect to titanium and zirconium, and having an atomic concentration ratio of barium to titanium and zirconium of 1 or more and 1.1 or less, and a subcomponent which contains 2 at % or more and 4 at % or less of europium with respect to the titanium of the barium zirconate titanate;
a plurality of internal electrode layers each of which is sandwiched by each two of the plurality of dielectric layers; and
external electrodes that are provided on side faces of the plurality of dielectric layers and the plurality of internal electrode layers, and are electrically connected to the plurality of internal electrode layers.

8. The multilayer ceramic electronic device as claimed in claim 7, wherein the base material contains zirconium in an amount of 14 at % or more with respect to titanium and zirconium in the barium titanate zirconate.

9. The multilayer ceramic electronic device as claimed in claim 7, wherein the base material contains 20 at % or less of zirconium with respect to titanium and zirconium in the barium titanate zirconate.

10. The multilayer ceramic electronic device claimed in claim 7,
wherein each of the plurality of dielectric layers contains dielectric crystals, each of which contains the base material and the subcomponent and has a core-shell structure, and
wherein an average grain size of the dielectric crystals is 200 nm or more and 400 nm or less.

11. The multilayer ceramic electronic device claimed in claim 7,
wherein the subcomponent includes divalent europium and trivalent europium, and
wherein a ratio of the divalent europium to the total of the divalent europium and the trivalent europium is 21% or more.

12. The multilayer ceramic electronic device as claimed in claim 7,
wherein the subcomponent includes divalent europium and trivalent europium, and
wherein a ratio of the divalent europium to the total of the divalent europium and the trivalent europium is 80% or less.

13. The multilayer ceramic electronic device as claimed in claim 7, wherein the multilayer ceramic electronic device satisfies X7T characteristic.

14. A manufacturing method of a multilayer ceramic electronic device comprising:
forming a ceramic green sheet by mixing a base material containing barium zirconate titanate as a main component, containing zirconium in an amount of 4 at % or more and 30 at % or less with respect to titanium and zirconium, and having an atomic concentration ratio of barium to titanium and zirconium of 1 or more and 1.1 or less, and a subcomponent which contains 2 at % or more and 4 at % or less of europium with respect to the titanium of the barium zirconate titanate;
forming an internal electrode pattern on the ceramic green sheet;
forming a stack by stacking a plurality of stack units each of which has a structure in which the internal electrode pattern is formed on the ceramic green sheet; and
firing the stack so as to form a plurality of dielectric layers and a plurality of internal electrodes.

15. The method as claimed in claim 14, wherein the firing is performed at a temperature increase rate of 6000° C./h or more.

* * * * *